No. 897,095. PATENTED AUG. 25, 1908.
F. A. HANENBERGER.
JOURNAL BOX FOR HAY LOADERS.
APPLICATION FILED NOV. 26, 1907.
2 SHEETS—SHEET 1.
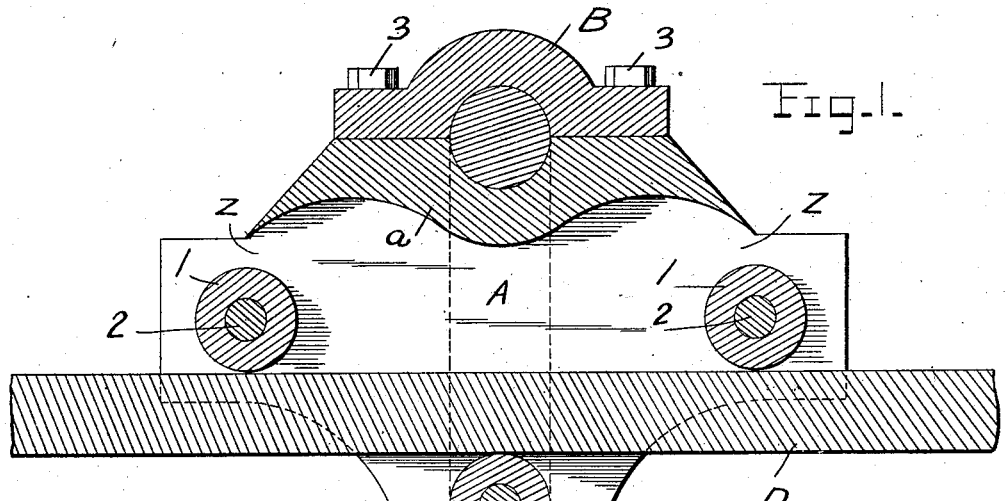
Fig. 1.
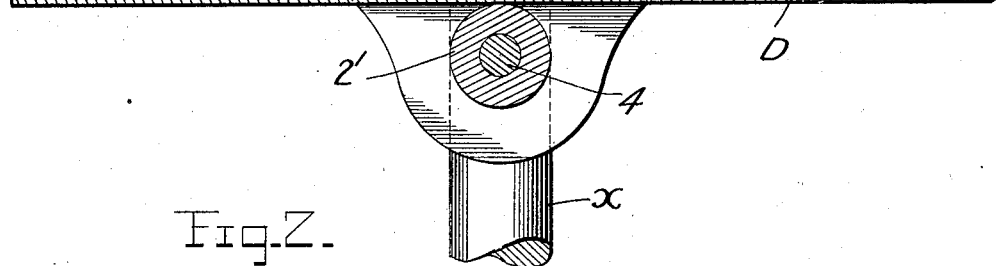
Fig. 2.
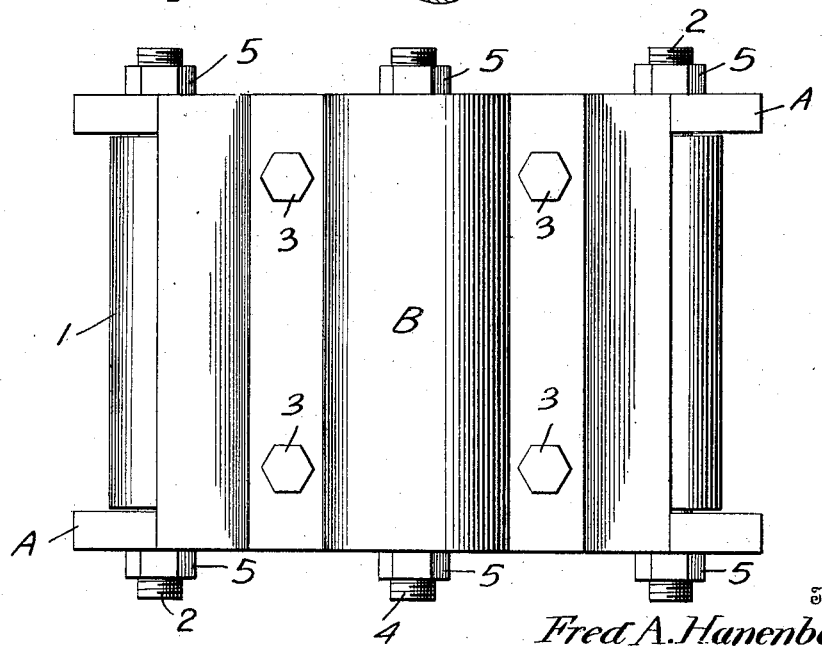
Witnesses
W. J. Rockwell
M. T. Miller
Inventor
Fred A. Hanenberger
By Chandler & Chandler
Attorneys No. 897,095.
PATENTED AUG. 25, 1908.
F. A. HANENBERGER.
JOURNAL BOX FOR HAY LOADERS.
APPLICATION FILED NOV. 26, 1907.
2 SHEETS—SHEET 2.
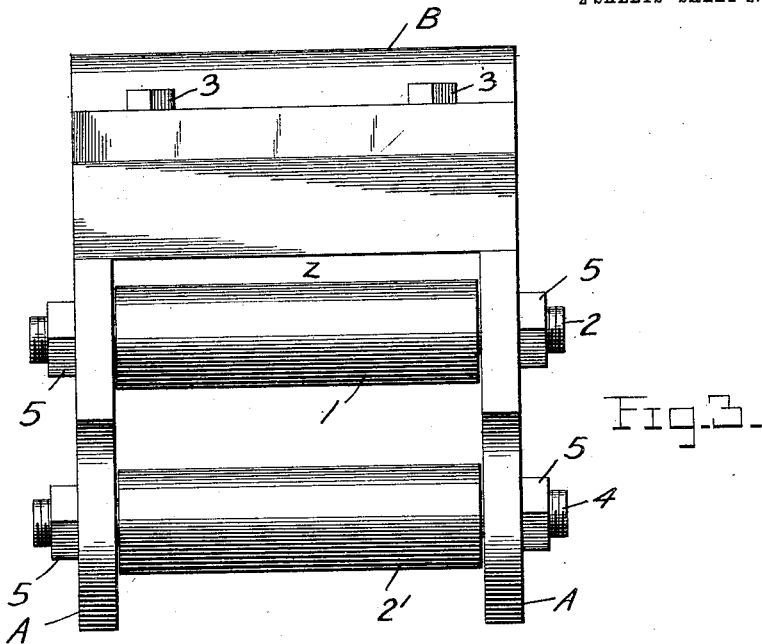
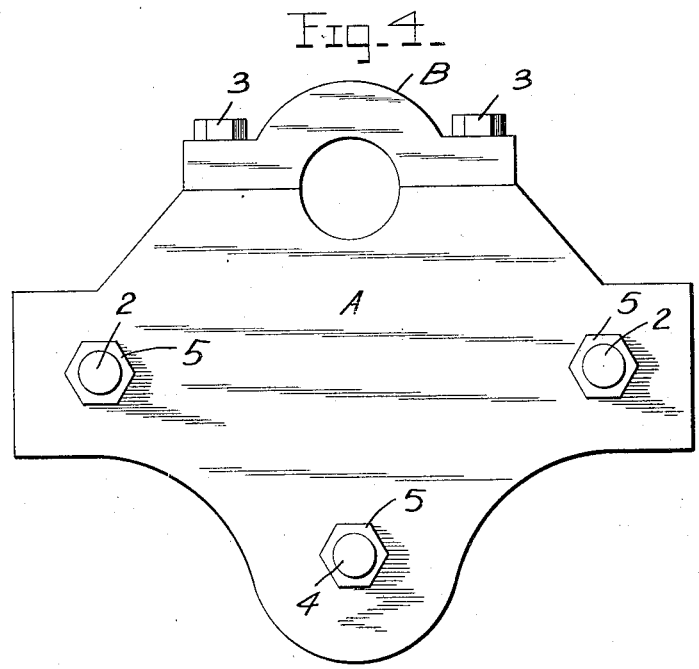
Inventor
Fred A. Hanenberger
Witnesses

UNITED STATES PATENT OFFICE.

FRED A. HANENBERGER, OF EYOTA, MINNESOTA.

JOURNAL-BOX FOR HAY-LOADERS.

No. 897,095.  Specification of Letters Patent.  Patented Aug. 25, 1908.

Application filed November 26, 1907. Serial No. 403,940.

*To all whom it may concern:*

Be it known that I, FRED A. HANENBERGER, a citizen of United States, residing at Eyota, in the county of Olmsted, State of Minnesota, have invented certain new and useful Improvements in Journal-Boxes for Hay-Loaders; and I do hereby declare the following to be a full, clear, and exact description of the invention, such as will enable others skilled in the art to which it appertains to make and use the same.

This invention relates to a new and useful journal box for hay loaders.

The object of my invention is to provide a journal box adapted to receive and guide the sliding boards of a hay loader and while my journal may be used wherever a reciprocating bar is to be guided as in hay loader construction for instance, the invention is especially adapted to be used in connection with the so called Rock Island hay loader.

In the accompanying drawings I have shown in Figure 1 a sectional view of the journal-bearing embodying my invention. Fig. 2 shows a top view of my bearing. Fig. 3 discloses an end view, while, Fig. 4 shows a side elevation of a journal-bearing embodying my invention.

In hay loader construction it is found that the bearings secured to the crank shaft actuating the so called kicker bars from which extend what are known as sliding boards become clogged because they fill up with dust and chaff interfering with the operation of the sliding boards and not infrequently resulting in the breaking of the rakers or kicking bars. This clogging, of course, also interferes with the free operation of the hay loader.

In my present constructed journal-bearing the collection of chaff within the bearing is made impossible and the sliding boards are permitted free action which while eliminating the likelihood of the parts breaking at the same time also insures the device running freely and easily.

In the accompanying drawings I have shown my journal-bearing which includes a box embracing two similar sides A and the bearing lug $a$ disclosed in Fig. 1. Secured to this bearing lug $a$ is the upper section B forming a journal box or bearing within which is held a suitable crank shaft $x$ as disclosed in Fig. 1.

The upper portion of the journal box B is of conventional construction and secured by suitable bolts 3, a top view of these bolts being shown in Fig. 2. The sides A form supporting flanges and project beyond the bearing portion of the box as is shown in Fig. 4 to provide a support for two rollers 1, 1, the position of these rollers being clearly shown in Fig. 1. The sides of the bearing are perforated to receive the bolts 2, 2 which revolubly support the rollers 1, the bolts being secured by means of suitable nuts 5 as shown in Fig. 4.

Positioned immediately below and in alinement with the bearing $a$ is a roller 2' held upon a bolt 4, this bolt being secured by means of a suitable nut 5 as shown in Fig. 4. This lower roller 2' as disclosed in Fig. 1 is situated midway between the two upper rollers 1 and between these rollers 1, 1 and 2' is slidably held the sliding board D shown in Fig. 1 the lower roller 2' supporting the sliding board while the upper rollers guide the same. It will be noticed that a considerable space is permitted between the sliding board D and the bearing lug $a$ as shown in Fig. 1 and above each roller 1 is provided an opening or escape way $z$ and through this opening the chaff will find an escape in that ample room is provided between the rollers and the lug. This arrangement will prevent the sliding board from sticking or binding and as stated will insure the free operation of the sliding board D.

Having thus described my said invention what I claim as new and desire to secure by U. S. Letters Patent is—

A journal-bearing of the class described comprising a bearing lug having two projecting supporting flanges each being provided with three perforations, three bolts passing through said perforations, one bolt being centrally disposed below and extending parallel with the axis of said bearing said remaining two bolts being situated parallel with and above said centrally disposed bolt and one on each side of said bolt, and a roller revolubly held upon each of said bolts, said intermediately disposed roller being disposed below said lug, an escape way being provided above each of said upper rollers, as set forth.

In testimony whereof, I affix my signature, in presence of two witnesses.

FRED A. HANENBERGER.

Witnesses:
C. P. RUSSEL,
B. L. JOHNSON.